(12) United States Patent
Waters et al.

(10) Patent No.: US 11,448,438 B2
(45) Date of Patent: Sep. 20, 2022

(54) TRANSPORT CLIMATE CONTROL SYSTEM WITH AUXILARY COOLING

(71) Applicant: THERMO KING CORPORATION, Minneapolis, MN (US)

(72) Inventors: Scott A. Waters, Lakeville, MN (US); Martin Galansky, Rakovnik (CZ); Michal Kolda, Prague (CZ); Pavel Houdek, Hostivice (CZ); Brad A. Wilke, Randolph, MN (US)

(73) Assignee: Thermo King Corporation, Minneapolis, MN (US)

( * ) Notice: Subject to any disclaimer, the term of this patent is extended or adjusted under 35 U.S.C. 154(b) by 179 days.

(21) Appl. No.: 16/659,108

(22) Filed: Oct. 21, 2019

(65) Prior Publication Data

US 2021/0116156 A1 Apr. 22, 2021

(51) Int. Cl.
  *F25B 41/31* (2021.01)
  *F25B 13/00* (2006.01)
  *F25D 11/00* (2006.01)

(52) U.S. Cl.
  CPC .............. *F25B 41/31* (2021.01); *F25B 13/00* (2013.01); *F25D 11/003* (2013.01)

(58) Field of Classification Search
  CPC .. F25B 5/02; F25B 25/00; F25B 49/02; F25B 41/22; F25B 41/31; F25B 13/00; B60H 1/00; B60H 1/00278; F25D 11/003
  See application file for complete search history.

(56) References Cited

U.S. PATENT DOCUMENTS

| 2012/0125032 A1 | 5/2012 | Graaf et al. |
| 2012/0297805 A1 | 11/2012 | Kamada et al. |
| 2018/0001784 A1* | 1/2018 | Porras ................ F25B 5/02 |

(Continued)

FOREIGN PATENT DOCUMENTS

| DE | 102017114136 | 1/2018 |
| WO | 99/17066 | 4/1999 |

(Continued)

OTHER PUBLICATIONS

Extended European Search Report, issued in the corresponding European patent application No. 20203153.0, dated Mar. 19, 2021, 10 pages.

*Primary Examiner* — Elizabeth J Martin
(74) *Attorney, Agent, or Firm* — Hamre, Schumann, Mueller & Larson, P.C.

(57) ABSTRACT

A transport climate control system for a climate controlled transport unit includes a main heat transfer circuit and a chiller heat transfer circuit. The main heat transfer circuit includes a compressor, a condenser, a main expansion valve, a main evaporator, a chiller expansion valve, and a chiller evaporator. The main evaporator and a chiller evaporator positioned are in parallel to each other downstream of the condenser. Working fluid and a second process fluid flowing through the main evaporator. Working fluid and a third process fluid flowing through the chiller evaporator. The chiller heat transfer circuit includes the chiller evaporator and the third process fluid is configured to provide auxiliary cooling. A method of operating a transport climate control system for a climate controlled transport unit includes operating in a HVACR and chiller mode, operating in a HVACR mode, and operating a chiller mode.

17 Claims, 7 Drawing Sheets

(56) References Cited

U.S. PATENT DOCUMENTS

2018/0195794 A1* 7/2018 Saunders ................ F25B 1/10
2019/0225047 A1* 7/2019 Porras ............... B60H 1/00778
2020/0309440 A1* 10/2020 Poolman ............ B60H 1/00771

FOREIGN PATENT DOCUMENTS

| WO | 99/23425 | 5/1999 |
|---|---|---|
| WO | 2019/158318 | 8/2019 |

\* cited by examiner

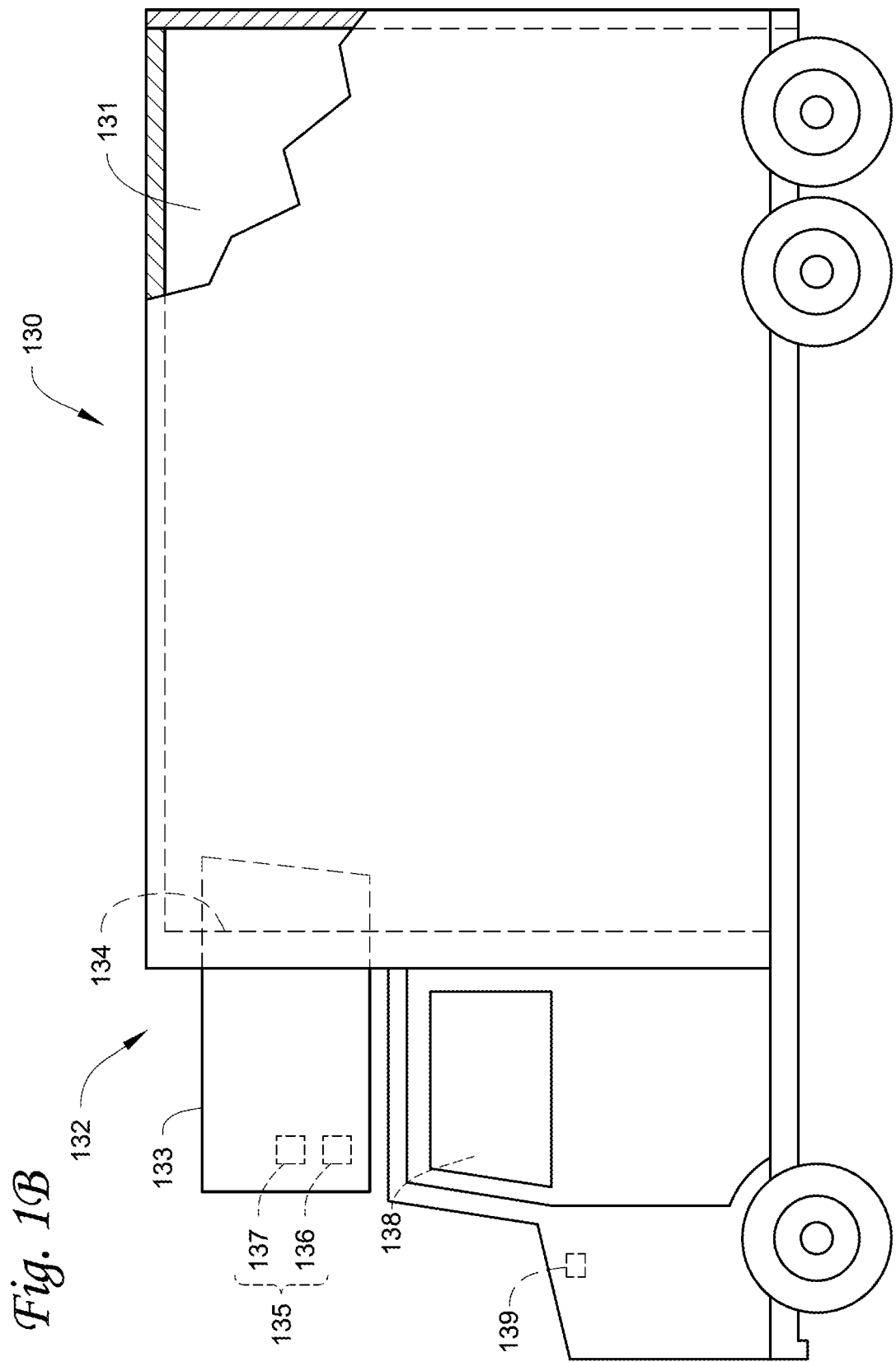

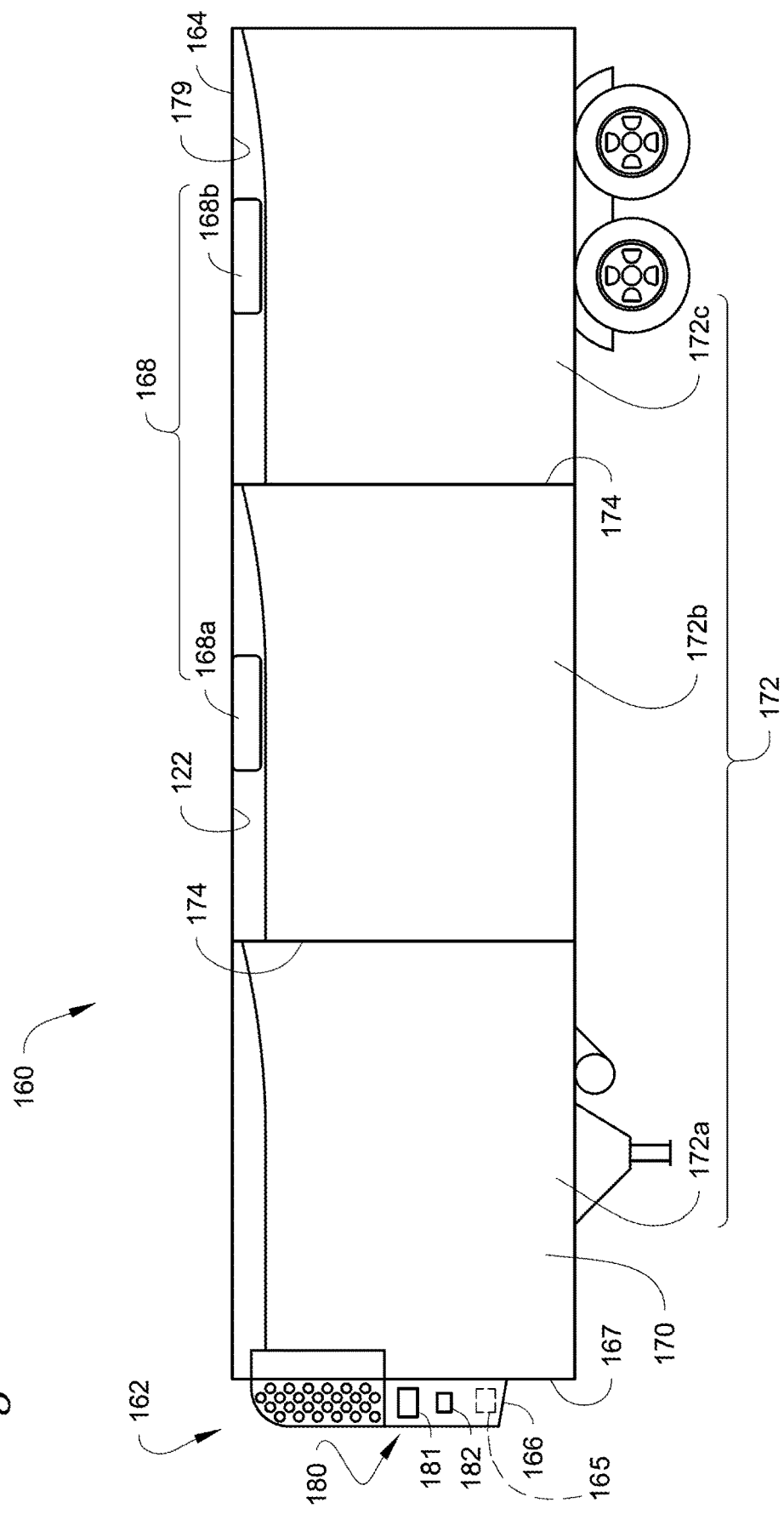

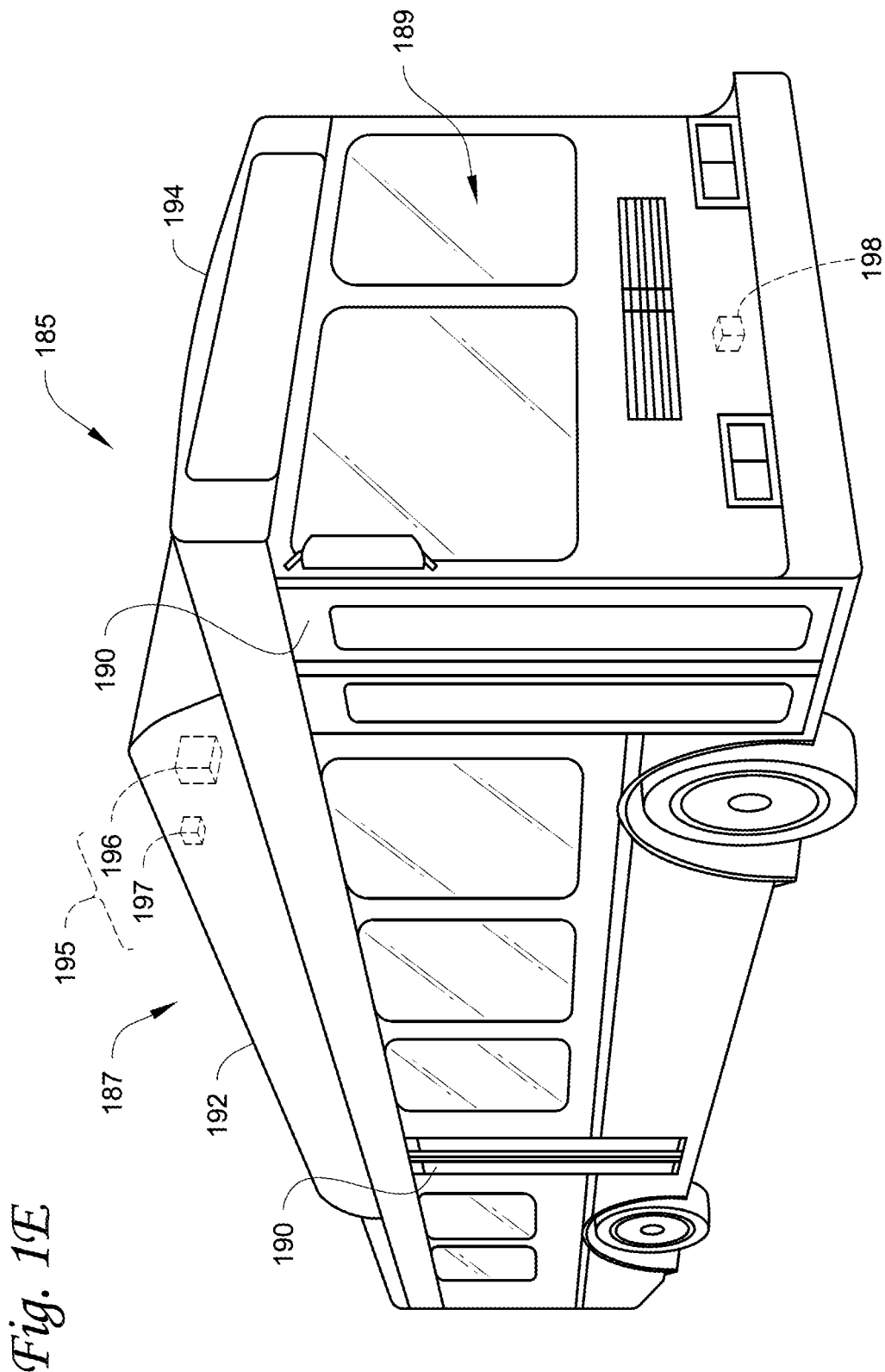

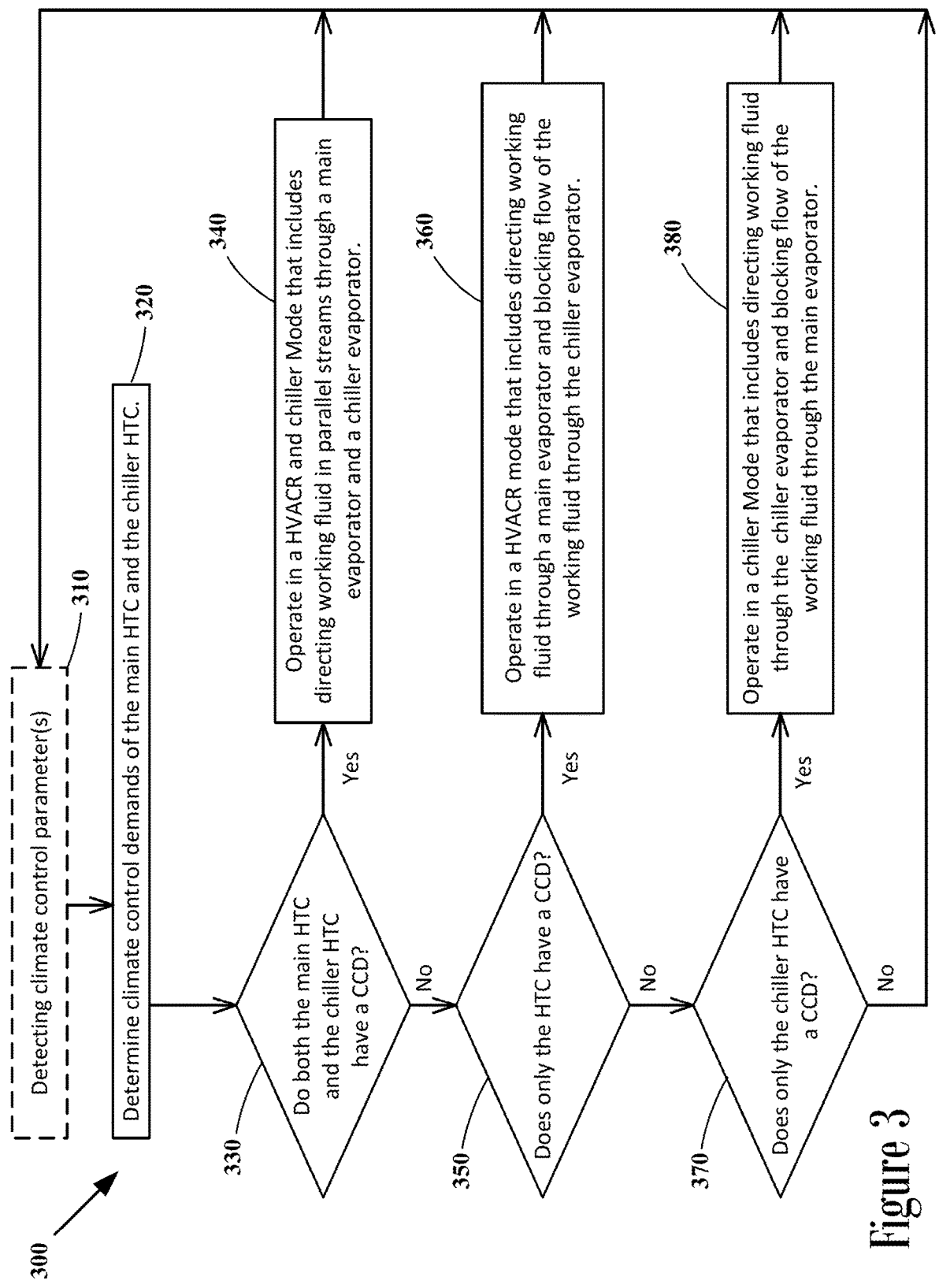

TRANSPORT CLIMATE CONTROL SYSTEM WITH AUXILARY COOLING

FIELD

This disclosure generally relates to transport climate control systems. More specifically, this disclosure relates to capacity control of a transport climate control system that includes multiple evaporators.

BACKGROUND

A transport climate control system is generally used to control an environmental condition (e.g., temperature, humidity, air quality, and the like) within a transport unit (e.g., a container (such as a container on a flat car, an intermodal container, etc.), a truck, a box car, or other similar transport unit). A climate controlled transport unit is commonly used to transport perishable items such as produce, frozen foods, and meat products. A climate controlled transport units are also used to transport passengers between locations.

The transport climate control system includes a climate control circuit that is attached to the transport unit to control one or more environmental conditions (e.g., temperature, humidity, atmosphere, etc.) of a particular space (e.g., a cargo space, a passenger space, etc.) (generally referred to as an "internal space"). The CCU can include, without limitation, a climate control circuit with a compressor, a condenser, an expansion valve, an evaporator, and fans and/or blowers to control a heat exchange between air inside the internal space and the ambient air outside of the climate controlled transport unit.

SUMMARY

The embodiments described herein are generally directed to capacity control of a transport climate control system that includes multiple evaporators.

Transport units can have a climate controlled space for cargo or passengers that is provided climate control (e.g., heated, cooled, etc.) by a transport climate control system. The transport unit or a tractor that tows the transport unit can also include electrical components (e.g., a battery, an inverter, etc.). An electric component can generate heat during operation that causes said electric component to operate inefficiently or become damaged. For example, a battery charging system and/or power supplying electronics may generate significant heat during use. Also, for example, a battery in a transport unit can generate substantial heat when being charged and discharged, and/or static converter can generate substantial heat when converting power. The heat can significantly impact the efficiency of the battery and/or damage the battery. The transport unit or the tractor that tows the transport unit may include an operating compartment for an operator of the transport unit or the tractor. Climate control of the operating space may be desirable.

The disclosed embodiments are capable of providing climate control to the climate controlled space and auxiliary cooling for electrical component(s) and/or secondary space(s). Disclosed embodiments can selectively provide the climate control for the climate controlled space, for the auxiliary cooling, and for both the climate controlled space and the auxiliary cooling. The disclosed embodiments provide adjustable capacity control between multiple evaporators by controlling, for example, an evaporator working fluid and/or an evaporator working fluid pressure passing through a refrigeration circuit having the multiple evaporators.

In an embodiment, a transport climate control system for a climate controlled transport unit includes a climate controlled space. The transport climate control system includes a main heat transfer circuit and a chiller heat transfer circuit. The main heat transfer circuit includes a compressor to compress a working fluid, a condenser, a main expansion valve, a main evaporator, a chiller electronic expansion valve (EEV), and a chiller evaporator. The compressor is configured to compress a working fluid and the condenser is configured to cool the compressed working fluid with a first process fluid.

The main expansion valve and the chiller EEV are located in parallel with each other downstream of the condenser and are configured to expand the working fluid cooled by the condenser. The main evaporator and the chiller evaporator are located in parallel to each other downstream of the condenser. The working fluid expanded by the main expansion valve flows to and through the main evaporator and is configured to cool a second process fluid in the main evaporator. The second process fluid is configured to cool the climate controlled space. The working fluid expanded by the chiller expansion valve flows to and through the chiller evaporator and cools a third process fluid in the chiller evaporator.

The chiller heat transfer circuit includes the chiller evaporator. The third process fluid is configured to flow through the chiller heat transfer circuit and to provide auxiliary cooling within the transport climate control system.

In an embodiment, the main expansion valve is a thermostatic expansion valve and the heat transfer circuit includes an electronic pressure regulator downstream of the main evaporator and upstream of the compressor.

In an embodiment, the main expansion valve is an electronic expansion valve (EEV) that is adjustable to control a flow rate of the working fluid through the main EEV.

In an embodiment, a method of operating a transport climate control system for a climate control includes, determining a climate control demand for a main heat transfer circuit and determining a climate control demand for a chiller heat transfer circuit. The climate control system includes the main heat transfer circuit and the chiller heat transfer circuit. The main heat transfer circuit including a compressor, a condenser, a main evaporator and a chiller evaporator located in parallel to each other downstream of the condenser, and a main expansion valve and a chiller electronic expansion valve (EEV) downstream of the condenser. The chiller heat transfer circuit includes the chiller evaporator.

The method includes operating in a heating, ventilation, air conditioning, and refrigeration (HVACR) and chiller mode when both the main heat transfer circuit and the chiller heat transfer circuit have a respective climate control demand. Operating in the HVACR and chiller mode includes directing working fluid in parallel streams through the main evaporator and the chiller evaporator. The main evaporator cools a process fluid for cooling the climate controlled space. The chiller evaporator cools different process fluid for providing auxiliary cooling within the transport climate control system.

The method includes operating in the HVACR mode when only the main heat transfer circuit has the climate control demand. Operating in the HVACR mode includes directing the working fluid through the main evaporator and the chiller EEV blocking flow of the working fluid to the chiller evaporator.

The method includes operating in a chiller mode when only the chiller heat transfer circuit has the climate control demand. Operating in the chiller mode includes directing the working fluid through the chiller evaporator and blocking the flow of the working fluid to the main evaporator.

BRIEF DESCRIPTION OF THE DRAWINGS

Both described and other features, aspects, and advantages of a heat transfer circuit and methods of operating a heat transfer circuit will be better understood with the following drawings:

FIG. 1B is a partial side view of an embodiment of a climate-controlled straight truck.

FIG. 1D is a cross sectional view of an embodiment of a climate controlled transport unit.

FIG. 1E is a front prospective view of an embodiment of a climate controlled vehicle for transporting passengers.

FIG. 3 is a block flow diagram of an embodiment of a method of operating a transport climate control system for a climate controlled transport unit.

Like reference characters refer to similar features.

DETAILED DESCRIPTION

Figure 1A:
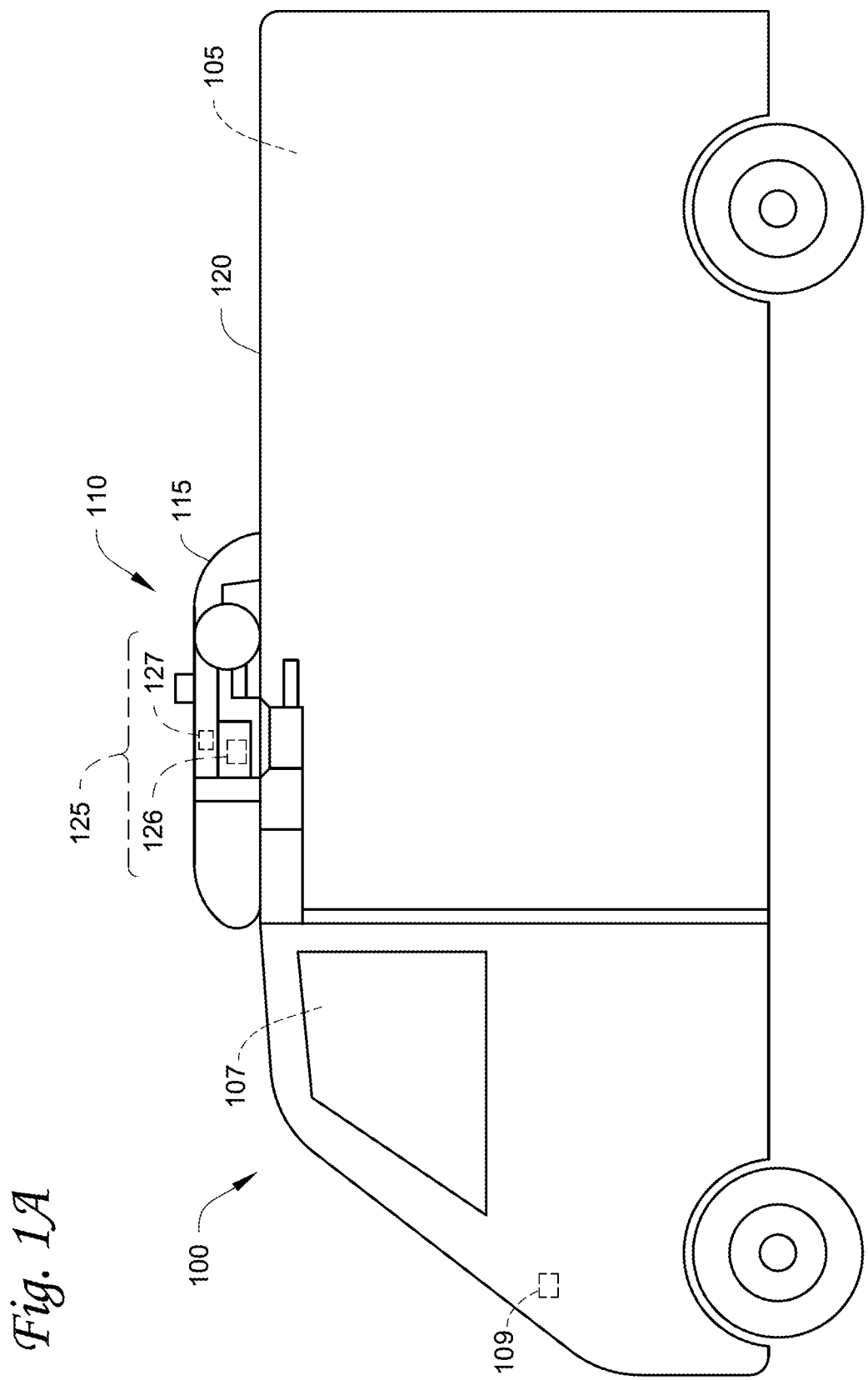
FIG. 1A is a side view of an embodiment of a climate-controlled van.

The embodiments described herein are generally directed to capacity control of a transport climate control system that includes multiple evaporators.

In the following detailed description, reference is made to the accompanying drawings, which illustrate embodiments in which the invention may be practiced. These embodiments are described in sufficient detail to enable those skilled in the art to practice what is claimed, and it is to be understood that other embodiments may be utilized without departing form the spirit and the scope of the claims. The following detailed description and the accompanying drawings, therefore, are not to be taken in a finite sense.

Different types of goods/cargo may need to be stored at specific environmental condition(s) while being stored within a transport unit. For example, perishable goods may need to be stored within a specific temperature range to prevent spoilage and liquid goods may need to be kept at a temperature above their freezing point. Also, goods having electronic components may need to be kept in environmental conditions with a lower moisture content to avoid damage to their electronic components. Passengers traveling in the transport unit may need to be kept in a climate controlled space with specific environmental condition(s) to ensure their comfort while traveling. For example, the climate controlled space containing the passengers should be at a temperature that is generally comfortable for passengers. A transport climate control system may blow conditioned air into the climate controlled space of the transport unit to keep the air within the climate controlled space at the desired environmental conditions.

A transport unit or a tractor that tows the transport unit may have electronic component(s) that are temperature sensitive and/or generate significant heat while operating. For example, a transport unit may include a battery that generates significant heat when being discharged and/or charged. A transport unit or a tractor that tows the transport unit may have an operator space for an operator that operates the transport unit and/or tractor.

The embodiments described herein are generally directed to capacity control of a transport climate control system that includes multiple evaporators. In some embodiments, a climate control circuit is provided that includes a main heat transfer circuit and a chiller heat transfer circuit. The main heat transfer circuit includes a main evaporator and a chiller evaporator that are located in parallel to each other. The main heat transfer circuit can be configured to provide climate control to a climate controlled space of the transport unit that can store, for example, goods or passengers. The chiller heat transfer circuit includes the chiller evaporator and can be configured to provide auxiliary climate control that can provide climate control, independent of the main heat transfer circuit, to provide climate control to an electrical component(s) (e.g., a battery), or an operator space separate from the climate controlled space. For example, the climate control circuit can advantageously distribute cooling capacity to the climate controlled space and the auxiliary climate control, direct its capacity to only main heat transfer circuit, or direct its capacity to only the auxiliary climate control by controlling the pressure in the evaporators and/or the flow of working fluid through each of the evaporators.

FIG. 1A illustrates one embodiment of a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (see FIG. 2) that connects, for example, a compressor, a condenser, evaporator(s) and an expansion device to provide climate control within the climate controlled space 105.

The climate-controlled van 100 may include a second climate controlled space 107. The second climate controlled space 107 may be an operator compartment of the climate-controlled van 100 (e.g., a cabin, etc.). For example, the second climate controlled space 107 accommodates an operator when operating (e.g., driving, etc.) the climate-controlled van 100. In an embodiment, the transport climate control system 110 can be configured to also provide climate control to the second climate controlled space 107.

The climate-controlled van 100 may include a battery 109 that is a power source for operating the climate-controlled van 100 and/or for the transport climate control system 110. In an embodiment, the climate-controlled van 100 may also include an engine (not shown) as a power source. The climate-controlled van 100 may be a hybrid vehicle that uses a combination of battery power and engine power or an electric vehicle that does not include an engine. The transport climate control system 110 may be a hybrid power system that uses a combination of battery power and engine power or an electric power system that does not include or rely upon an engine (not shown) of the climate-controlled van 100 for power. The battery 109 in FIG. 1A is located outside the CCU 115. However, it should be appreciated that the battery 109 in an embodiment may be located in the CCU 115 and configured to supply power for operating the transport climate control system 110. In an embodiment, the transport climate control system 110 can be configured to provide climate control to the battery 109.

It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, a temperature of the battery 109, a temperature of the second climate controlled space 107, etc.) and communicate parameter data to the climate controller 125. The climate controller 125 is configured to control operation of the transport climate control system 110 including the components of the climate control circuit. The climate controller 115 may comprise a single integrated control unit 126 or may comprise a distributed network of climate controller elements 126, 127. The number of distributed control elements in a given network can depend upon the particular application of the principles described herein.

FIG. 1B illustrates one embodiment of a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (see FIG. 2) that connects, for example, a compressor, a condenser, an evaporator and an expansion device to provide climate control within the climate controlled space 131.

The climate-controlled straight truck 130 may include a second climate controlled space 138. The second climate controlled space 138 may be an operator compartment of the climate-controlled straight truck 130 (e.g., a cabin, etc.). For example, the second climate controlled space 144 may accommodate an operator of the climate-controlled straight truck 130 when operating the climate-controlled straight truck 130 (e.g., driving, etc.). In an embodiment, the transport climate control system 132 can be configured to provide climate control to the second climate controlled space 138.

The climate-controlled straight truck 130 may include a battery 139 that is a power source for operating climate-controlled straight truck 130 and/or for the transport climate control system 132. In an embodiment, the climate-controlled straight truck 130 may also include an engine (not shown) as a power source. The climate-controlled straight truck 130 may be a hybrid vehicle that uses a combination of battery power and engine power or an electric vehicle that does not include an engine. The transport climate control system 132 may be a hybrid power system that uses a combination of battery power and engine power or an electric power system that does not include or rely upon an engine (not shown) of the climate-controlled straight truck 130 for power. The battery 139 in FIG. 1B is located outside the CCU 133. However, it should be appreciated that the battery 139 in an embodiment may be located in the CCU 133 and configured to supply power to the transport climate control system 132. In an embodiment, the transport climate control system 132 can be configured to provide climate control to the battery 139.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, a temperature of the battery 139, a temperature of the second climate controlled space 138, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed control elements in a given network can depend upon the particular application of the principles described herein.

Figure 1C:
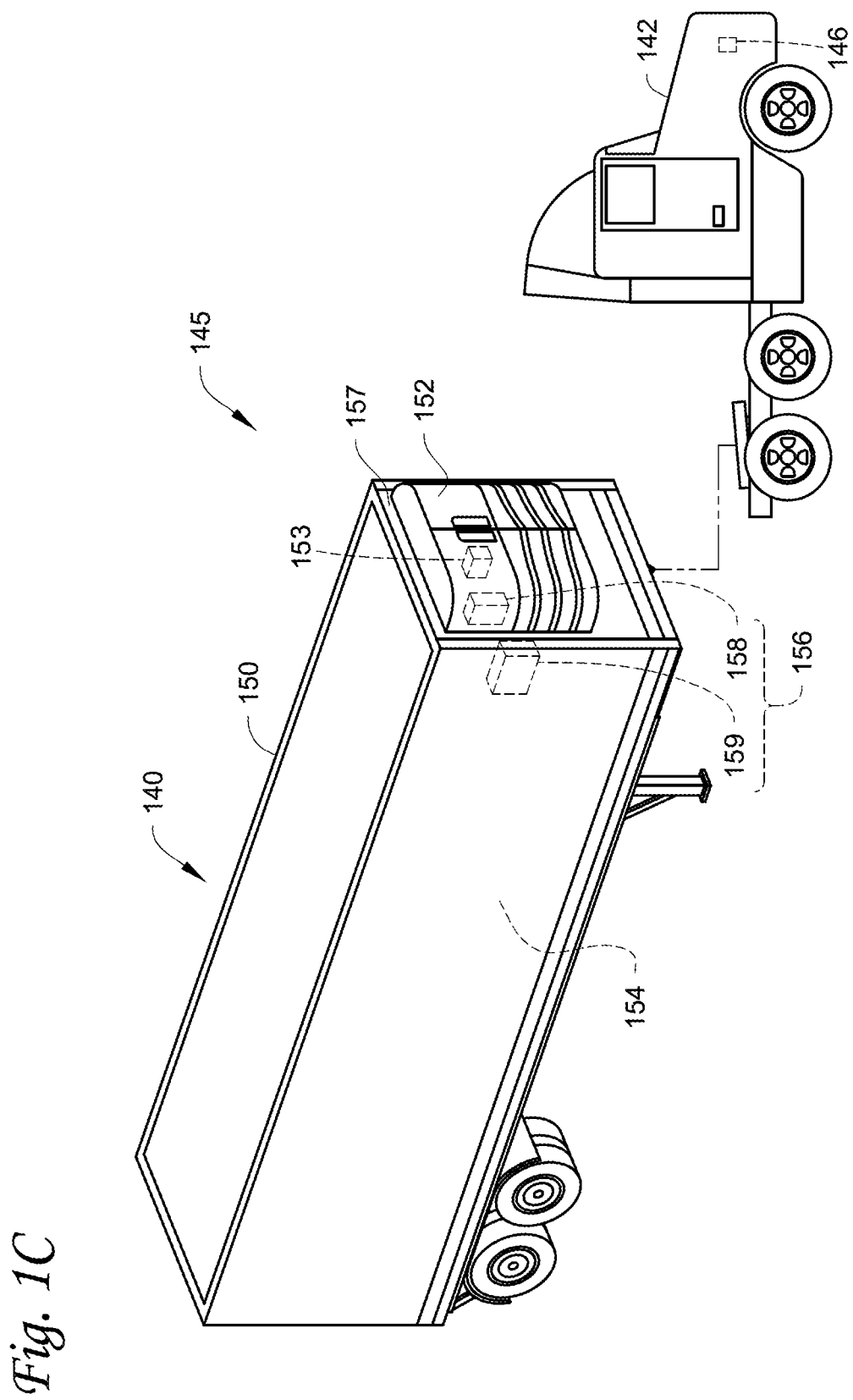
FIG. 1C is a side prospective view of an embodiment of a climate controlled transport unit and a tractor.

FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (see FIG. 2) that connects, for example, a compressor, a condenser, an evaporator and an expansion device to provide conditioned air within the climate controlled space 154.

The tractor 142 may include a second climate controlled space 144. The second climate controlled space 144 may be an operator compartment of the tractor 142 (e.g., a cabin, etc.). For example, the second climate controlled space 144 may accommodate an operator of the tractor 142 when operating the tractor 142 (e.g., driving, etc.). In an embodiment, the transport climate control system 145 can be configured to provide climate control to the second climate controlled space 144.

The tractor 142 may include a battery 139 that is a power source for operating the tractor 142 and/or for the transport climate control system 145. In an embodiment, the tractor 142 may also include an engine (not shown) as a power source. The tractor 142 may be a hybrid vehicle that uses a combination of battery power and engine power or an electric vehicle that does not include an engine.

The climate controlled transport unit 140 may include a battery 153 that is a power source for the transport climate control system 145. The transport climate control system 145 may be a hybrid power system that uses a combination of battery power and engine power or an electric power system that does not include or rely upon an engine (not shown) of climate controlled transport unit 140 or the tractor 142 for power. The battery 153 in FIG. 1C is located within the CCU 152. However, it should be appreciated the battery 153 in an embodiment may be located outside of the CCU 152. In such an embodiment, the battery 153 may be, for example, attached to the underside of the climate controlled transport unit 150. In an embodiment, the transport climate control system 145 can be configured to provide climate control to the battery 146 and/or the battery 153.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, a temperature of the battery 146, a temperature of the battery 153, a temperature of the second climate controlled space 144, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed control elements in a given network can depend upon the particular application of the principles described herein.

FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (e.g., the tractor 142 in FIG. 1C). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172a of the climate controlled space 170. The remote unit 168a can provide climate control within a second zone 172b of the climate controlled space 170. The remote unit 168b can provide climate control within a third zone 172c of the climate controlled space 170. Accordingly, the MTCS 162 can be used to separately and independently control environmental condition(s) within each of the multiple zones 172 of the climate controlled space 170.

The CCU 166 is disposed on a front wall 167 of the transport unit 160. In other embodiments, it will be appreciated that the CCU 166 can be disposed, for example, on a rooftop or another wall of the transport unit 160. The CCU 166 includes a climate control circuit (see FIG. 2) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a,b include an evaporator (not shown) that connects to the rest of the climate control circuit provided in the CCU 166.

The climate controlled transport unit 160 may include a battery 165 that is a power source for the MTCS 162. In an embodiment, the CCU 166 may also include an engine (not shown) as a power source. The MTCS 162 may be a hybrid power system that uses a combination of battery power and engine power or an electric system that does not include or rely upon an engine (not shown) of the climate controlled transport unit 162 or the tractor for power. The battery 165 in FIG. 1D is part of the MTCS 162. However, it should be appreciated that the battery 165 in an embodiment may be located outside of the MTCS 162. In such an embodiment, the battery 165 may be, for example, attached to the underside of the climate controlled transport unit 160. In an embodiment, the MTCS 162 can be configured to provide climate control to the battery 162, a second climate controlled space in the tractor that tows the climate controlled transport unit 160 (e.g., second climate controlled space 144), and/or a battery of the tractor (e.g., battery 146), etc.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, a temperature of the battery 146, a temperature of a battery of the tractor, a temperature of the second climate controlled space in the tractor, etc.) and communicate parameter data to a climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed control elements in a given network can depend upon the particular application of the principles described herein.

FIG. 1E is a perspective view of a vehicle 185 including a transport climate control system 187, according to one embodiment. The vehicle 185 is a mass-transit bus that can carry passenger(s) (not shown) to one or more destinations. In other embodiments, the vehicle 185 can be a school bus, railway vehicle, subway car, or other commercial vehicle that carries passengers. The vehicle 185 includes a climate controlled space (e.g., passenger compartment) 189 supported that can accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 170 includes a climate control circuit (see FIG. 2) that connects, for example, a compressor, a condenser, an evaporator and an expansion device to provide conditioned air within the climate controlled space 189.

The vehicle 185 may include a battery 198 that is a power source for operating the vehicle 185 and/or for the transport climate control system 187. In an embodiment, the vehicle 185 may also include an engine (not shown) as a power source. The vehicle 185 may be a hybrid vehicle that uses a combination of battery power and engine power or an electric vehicle that does not include an engine. The transport climate control system 187 may be a hybrid power system that uses a combination of battery power and engine power or an electric power system that does not include or rely upon an engine (not shown) of the vehicle 185 for power. The battery 198 in FIG. 1E is located outside the CCU 192. However, it should be appreciated that the battery 198 in an embodiment may be located in the CCU 192 and configured to supply power to the transport climate control system 187. In an embodiment, the transport climate control system 187 can be configured to provide climate control to the battery 198.

The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, a temperature fo the battery 198, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed control elements in a given network can depend upon the particular application of the principles described herein.

Figure 2:
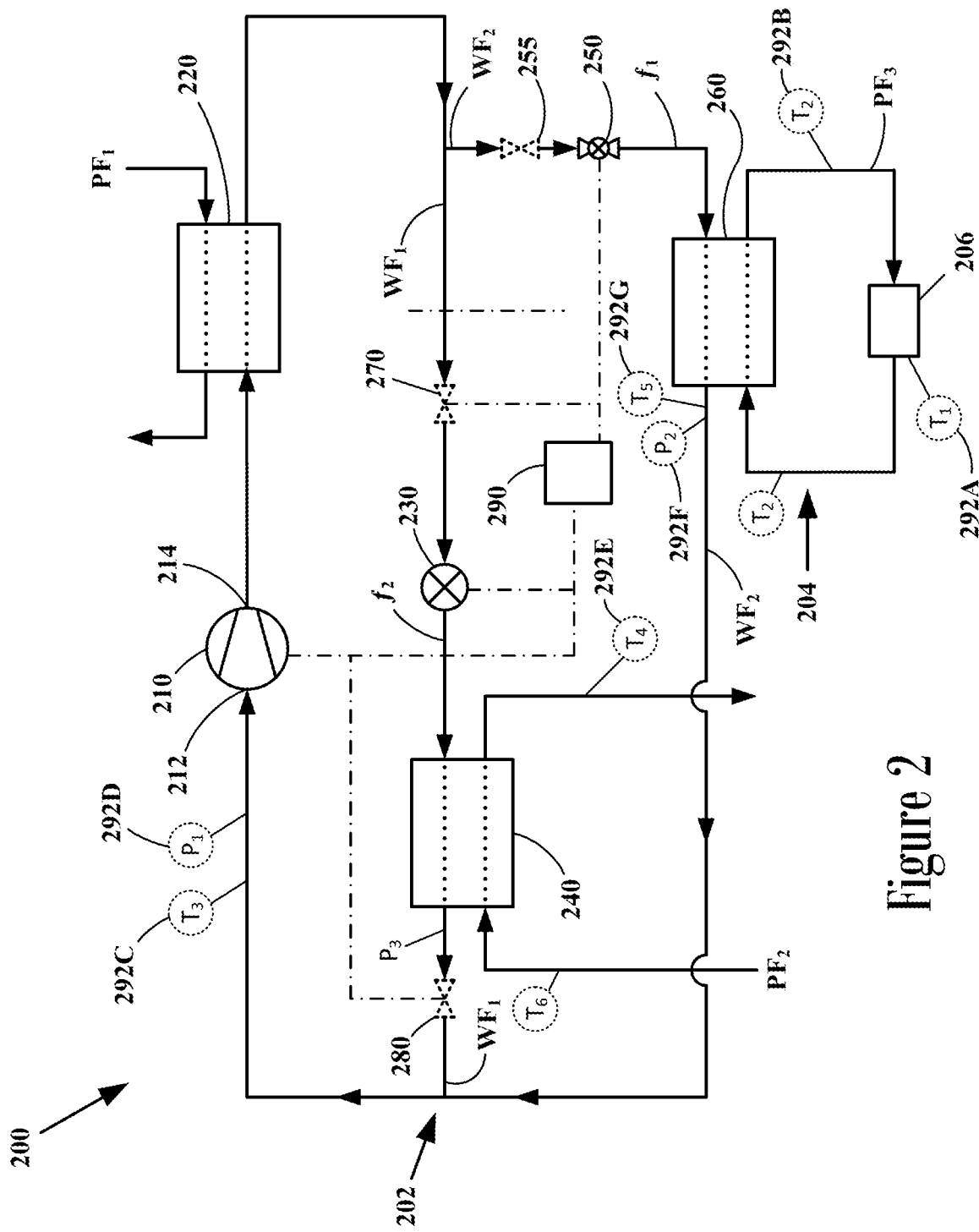
FIG. 2 is a block schematic diagram of an embodiment of a climate control circuit for a transport climate control system.

FIG. 2 is a schematic diagram of an embodiment of a climate control circuit 200. In an embodiment, the climate control circuit 200 is utilized to control an environmental condition (e.g., temperature, humidity, air quality, etc.) in a climate controlled space of a transport unit. For example, the climate control circuit 200 may be utilized in a transport climate control system (e.g., transport climate control system 110, transport climate control system 132, transport climate control system 145, multi-zone transport climate control system 162, the transport climate control system 187, etc.).

The climate control circuit 200 includes a main heat transfer circuit 202 and a chiller heat transfer circuit 204. The main heat transfer circuit 202 includes a compressor 210, a condenser 220, a main expansion valve 230, a main evaporator 240, a chiller electronic expansion valve (EEV) 250, a chiller evaporator 260, and a programmable climate controller 290. The main heat transfer circuit 202 in an embodiment may also include an optional solenoid valve 270 and/or an optional electronic pressure regulator (EPR) valve 280. In an embodiment, the main heat transfer circuit 202 can be modified to include additional components, such as, for example, an economizer heat exchanger, one or more additional valve(s), sensor(s) (e.g., a flow sensor, a temperature sensor), a receiver tank, a filter drier, or the like.

The components of the main heat transfer circuit 202 are fluidly connected. Dotted lines are provided in FIG. 2 to indicate fluid flows various components (e.g., condenser 220, main evaporator 240, chiller evaporator 260) for clarity, and should be understood as not specifying a particular route within each component. Dashed lines are provided to illustrate optional components. Dashed dotted lines are provided in the Figures to illustrate electronic communications between different components. For example, a dashed dotted line extends from the climate controller 290 to the compressor 210 as the climate controller 290 is configured to control the compressor 210.

In an embodiment, the climate controller 290 includes a memory (not shown) for storing information and a processor (not shown). In an embodiment, the climate controller 290 is a climate controller of a transport climate control system (e.g., climate controller 125, climate controller 135, climate controller 156, climate control 195, etc.). The climate controller 290 is shown in FIG. 1 as a single integrated control unit. However, it should be appreciate that the climate controller 290 in an embodiment may a single integrated control unit or a distributed network of climate controller elements (e.g., distributed network of climate controller elements 126, 127, distributed network of climate controller elements 136, 137, distributed network of climate controller elements 158, 159, distributed network of climate controller elements 196, 197, etc.).

A working fluid (e.g., a refrigerant, a refrigerant mixture, etc.) flows through the main heat transfer circuit 202. The compressor 210 includes a suction inlet 212 and a discharge outlet 214. Working fluid in a lower pressure gaseous state or mostly gaseous state is drawn into the suction inlet 212 of the compressor 210. The working fluid is compressed as it flows through the compressor 210. Compressed working fluid is discharged from the discharge outlet 214 of the compressor 210 and flows to the condenser 220. In an embodiment, the compressor 210 may be a single speed compressor. In an embodiment, the compressor 210 may be a multispeed compressor. In such an embodiment, the compressor 210 may be, for example, an engine driven multispeed compressor.

A first process fluid $PF_1$ flows through the condenser 220 separate from the working fluid. The condenser 220 is a heat exchanger that allows the working fluid and the first process fluid $PF_1$ to be in a heat transfer relationship without physically mixing as they each flow through the condenser 220. As the working fluid flows through the condenser 220, the first process fluid $PF_1$ absorbs heat from the working fluid and cools the working fluid. In an embodiment, the first process fluid $PF_1$ may be air, water and/or glycol, or the like that is suitable for absorbing and transferring heat from the working fluid and the climate control circuit 200. For example, the first process fluid $PF_1$ may be ambient air circulated from an outside atmosphere (e.g., from outside the climate controlled transport unit), water to be heated as hot water, or any suitable fluid for transferring heat from the climate control circuit 200. In an embodiment, the first process fluid $PF_1$ is ambient air from an outside atmosphere or an intermediate fluid that transfers heat to ambient air from the outside atmosphere. The working fluid is cooled by the condenser 220 and becomes liquid or mostly liquid as it passes through the condenser 220.

The working fluid flows from the condenser 220 to the main expansion valve 230 and the chiller EEV 250. The main expansion valve 230 and the chiller EEV 250 are located in parallel to each other downstream of the condenser 220. The main expansion valve 230 is downstream of the condenser 220 and upstream of the main evaporator 240. Working fluid is supplied to the main evaporator 240 by the main expansion valve 230. The chiller EEV 250 is downstream of the condenser 220 and upstream of the chiller evaporator 260. Working fluid is supplied to the chiller evaporator 260 by the chiller EEV 250.

As shown in FIG. 2, the main evaporator 240 and the chiller evaporator 260 are located in parallel to each other downstream of the condenser 220. When the climate control circuit 200 utilizes both the main evaporator 240 and the chiller evaporator 260, the working fluid after passing through the condenser 220 splits into multiple parallel streams $WF_1$, $WF_2$. Operation of the climate control circuit 200 is described in more detail below. A first stream of the working fluid discharged from the condenser 220 ("first working fluid stream" $WF_1$) travels through the main expansion valve 230 and the main evaporator 240. A second stream of the working fluid discharged from the condenser 220 ("second working fluid stream" $WF_2$) travels through the chiller EEV 250 and the chiller evaporator 260.

In an embodiment, the main heat transfer circuit 202 may include one or more additional evaporator(s) (not shown) for cooling the climate controlled space (e.g., evaporator(s) in remote unit(s) 168, etc.). In such an embodiment, the additional evaporator(s) may be in parallel with the main evaporator 240 and the chiller evaporator. The additional evaporator(s) may include expansion valve(s), pressure regulation valve(s), and/or flow control valve(s) similar to the main evaporator 240.

The main expansion valve 230 and the chiller EEV 250 each allow the working fluid to expand as it flows through the respective valve. The expansion causes the working fluid to significantly decrease in temperature. The lower temperature gaseous/liquid working fluid expanded by the main expansion valve 230 and the chiller EEV 250 then flows to the main evaporator 240 and the chiller evaporator 260.

The working fluid in the first working fluid stream $WF_1$ is expanded by the main expansion valve 230 and flows from the main expansion valve 230 to the main evaporator 240. The lower temperature gaseous/liquid working fluid flows from the main expansion valve 230 to and through the main evaporator 240. A second process fluid $PF_2$ also flows through the main evaporator 240 separately from the working fluid. The main evaporator 240 is a heat exchanger that allows the working fluid and the second process fluid $PF_2$ to be in a heat transfer relationship without physically mixing as they each flow through the main evaporator 250. As the working fluid and the second process fluid $PF_2$ flow through the main evaporator 250, the working fluid absorbs heat from the second process fluid $PF_2$ which cools the second process fluid $PF_2$. The second process fluid $PF_2$ exits the main evaporator 250 at a lower temperature than it entered the main evaporator 250. The working fluid is gaseous or mostly gaseous as it exits the main evaporator 250. In FIG. 2, the working fluid and the second process fluid $PF_2$ flow through the main evaporator 250 in a counter-flow. However, it should be appreciated that in other embodiments the working fluid and the second process fluid $PF_2$ may flow through the main evaporator 250 in a parallel flow.

The second process fluid $PF_2$ is configured to cool a climate controlled space (e.g., climate controlled space 105, climate controlled space 131, climate controlled space 154, climate controlled space 170, climate controlled space 189). The second process fluid $PF_2$ may be configured to cool the climate controlled space directly or indirectly. In an embodiment, the second process fluid $PF_2$ is air and the cooled second process fluid $PF_2$ is ventilated to the climate controlled space. In an embodiment, the second process fluid $PF_2$ is an intermediate fluid (e.g., water, a water/glycol mixture, a heat transfer fluid, etc.), and the transport climate control system utilizes the cooled second process fluid $PF_2$ to cool air ventilated to the climate controlled space or circulates the cooled second process fluid $PF_2$ through the climate controlled space providing the cooling in the climate controlled space.

The working fluid in the second working fluid stream $WF_2$ is expanded by the chiller EEV 250 and flows from the chiller EEV 250 to and through the chiller evaporator 260. A third process fluid $PF_3$ also flows through the chiller evaporator 260 separately from the working fluid. The chiller evaporator 260 is a heat exchanger that allows the working fluid and the third process fluid $PF_3$ to be in a heat transfer relationship without physically mixing as they each flow through the chiller evaporator 260. As the working fluid and the third process fluid $PF_3$ flow through the chiller evaporator 260, the working fluid absorbs heat from the third process fluid $PF_3$ which cools the third process fluid $PF_3$. The third process fluid $PF_3$ exits the chiller evaporator 260 at a lower temperature than it entered the chiller evaporator 260. The working fluid is gaseous or mostly gaseous as it exits the chiller evaporator 260. In FIG. 2, the working fluid and the third process fluid $PF_3$ flow through the chiller evaporator 260 in a counter-flow. However, it should be appreciated that in other embodiments the working fluid and the third process fluid $PF_3$ may flow through the chiller evaporator 260 in a parallel flow.

The working fluid exiting the main evaporator 240 flows from the main evaporator 240 to the suction inlet 212 of the compressor 210. The working fluid exiting the chiller evaporator 260 flows from the chiller evaporator 260 to the suction inlet 212 of the compressor 210. The first working fluid stream $WF_1$ and the second working fluid stream $WF_2$ converge upstream of the compressor 210. The working fluid flowing from the main evaporator 240 mixes with the working fluid flowing from the chiller evaporator 260 and flows into the suction inlet 212 of the compressor 210.

In an embodiment, the main expansion valve 230 is a thermostatic expansion (TX) valve, and the main heat transfer circuit 202 includes the solenoid valve 270 and the EPR valve 280. In an embodiment, the compressor 210 may also be a variable speed compressor. The TX valve is configured to regulate a flow $f_1$ of working fluid into the main evaporator 240 such that a superheat of the working fluid discharged from the main evaporator 240 is at or about constant. The solenoid valve 270 can be closed to stop flow of the working fluid through the main TX valve 230 and the main evaporator 240. The EPR valve 280 is configured to regulate the pressure of the working fluid passing through the EPR valve 280. The EPR valve 280 is configured to allow only working fluid with at least a specific pressure to pass through. Operation of the variable speed compressor 210, solenoid valve 270, and the EPR valve 280 in an embodiment of the climate control circuit 200 is discussed in more detail below.

In an embodiment, the main expansion valve 230 is a main electronic expansion valve (EEV). In such an embodiment, the climate control circuit 200 includes the main EEV 230 and the chiller EEV 250. In such an embodiment, the climate control circuit 200 may not include the optional solenoid valve 270 and/or the optional EPR valve 280. Operation of the main EEV 230 and the chiller EEV 250 in an embodiment of the climate control circuit 200 is discussed in more detail below.

The chiller heat transfer circuit 204 includes the chiller evaporator 260. In an embodiment, the third process fluid $PF_3$ is configured to provide auxiliary cooling within the transport climate control system. In an embodiment, the auxiliary cooling is for cooling component(s) and/or climate controlled space(s) different than the climate controlled space conditioned by the second process fluid $PF_2$. In an embodiment, the chiller heat transfer circuit 204 is configured to provide climate control (e.g., cooling, heating, etc.)

to an electronics component 206 in the transport unit or a tractor that tows the transport unit. In an embodiment, the auxiliary cooling provided by the third process fluid $PF_3$ is for cooling at least the electronic component 206. In an embodiment, the third process fluid $PF_3$ cools an intermediate fluid (e.g., air, water, a water/glycol mixture, a heat transfer fluid, etc.) that flows along and cools the electronic component 206.

In an embodiment, the electronic component 206 is a battery (e.g., battery 109, battery 139, battery 146, battery 153, battery 165, battery 198, etc.). In an embodiment, the battery may be in the form of a single unit. However, it should be appreciated that a battery in an embodiment may be in the form of multiple battery packs. In an embodiment, the third process fluid $PF_3$ flows through the battery and/or along a heatsink of the battery. In an embodiment, the electronic component 206 is component of the electronic charging system that charges at least one battery (e.g., battery 109, battery 139, battery 146, battery 153, battery 165, battery 198, etc.) in the transport unit and/or a tractor that tows the transport unit. In an embodiment, the electronic component 206 is a power supply component (e.g., a static converter, etc.) in the transport unit.

In an embodiment, the chiller heat transfer circuit 204 can be modified to include additional components, such as, for example, additional heat exchangers, one or more additional valve(s), sensor(s) (e.g., a flow sensor, a temperature sensor), a receiver tank, or the like. The components of the chiller heat transfer circuit 204 are fluidly connected.

In an embodiment, the chiller heat transfer circuit 204 may include a heater heat exchanger (not shown) that is located in parallel with the chiller evaporator 260. The heater heat exchanger configured to utilize a fourth process fluid (not shown) to heat the third process fluid $PF_3$ when heating of the electronic component 206 is desired. The chiller heat transfer circuit 204 configured to have the third process fluid $PF_3$ bypass the heater heat exchanger when cooling of the electronic component 206 is desired. In a heat pump mode, the heat from the electronic component 206 may be transferred to the fourth process fluid (not shown), and the fourth process fluid may be used to heat the second process fluid $PF_2$ and/or the climate controlled space.

In an embodiment, the transport climate control system operates based on a climate control demand of the main heat transfer circuit 202 and a climate control demand of the chiller heat transfer circuit 204. The transport climate control system has a plurality of modes. In an embodiment, the transport climate control system operates the climate control circuit 200 in one of the modes based on the climate control demands of the main heat transfer circuit 202 and the chiller heat transfer circuit 204. In such an embodiment, the climate controller 290 may configure and/or operate components of the main heat transfer circuit 202 so the climate control circuit 200 operates according to an appropriate mode.

In an embodiment, the climate control demands are based on one or more parameters of transport unit or the tractor that tows the transport unit. In an embodiment, the climate control demands may be based on, for example but not limited to, one of more parameter(s) of the working fluid, the second process fluid $PF_2$, the third process fluid $PF_3$, the climate controlled space, and/or the electronic component 206. In an embodiment, the climate control circuit 200 may include, for example but not limited to, one or more of a temperature sensor 292A for detecting a temperature $T_1$ of the electronic component 206, a chiller outlet sensor 292B for detecting an outlet temperature $T_2$ of the third process fluid $PF_3$, a suction temperature sensor 292C for detecting a suction temperature $T_3$ of the working fluid entering the compressor 210, a suction pressure sensor 292D for detecting a suction inlet pressure $P_1$ of the working fluid entering the compressor 210, an evaporator outlet temperature sensor 292E for detecting an outlet temperature $T_4$ of the second process fluid $PF_2$, a chiller suction pressure sensor 292F for detecting a outlet pressure $P_2$ of the working fluid from the chiller evaporator 260, and/or a chiller suction temperature sensor 292G for detecting an outlet temperature $T_5$ of the working fluid from the chiller evaporator 260. In an embodiment, the climate controller 290 may utilize one or more of the sensors 292A, 292B, 292C, 292D, 292E, 292F, 292G to operate the climate control circuit 300. Connections (e.g., dashed-dotted lines) between the climate controller 290 and the sensors 292A, 292B, 292C, 292D, 292E, 292F, 292G are omitted in FIG. 2 for clarity.

In an embodiment, the climate control demand of the chiller heat transfer circuit 204 occurs when the chiller heat transfer circuit 204 is to climate control one or more of its components. In an embodiment, the chiller heat transfer circuit 204 has a climate control demand when the chiller heat transfer circuit 204 is to provide cooling to the electronic component 206. In an embodiment, the chiller heat transfer circuit 204 has a cooling demand for the electronic component. For example, a cooling demand may occur when the temperature $T_1$ of the electronic component 206 exceeds a predefined limit. In an embodiment, the electronic component 206 is based on the efficiently of the electronic component 206 or protecting the electronic component 206 from thermal damage.

In an embodiment, the climate control demand of the main heat transfer circuit 204 is a climate control demand for the climate controlled space. In an embodiment, a climate control demand occurs when the main heat transfer circuit 204 is to provide climate control to the climate controlled space. In an embodiment, the climate control demand may be a cooling demand for the climate controlled space. For example, a cooling demand for the climate controlled space may occur when a difference between the temperature of the climate controlled space and a setpoint temperature exceeds a predetermined amount.

HVACR and Chiller Mode

In an embodiment, the transport climate control system can be configured to operate the climate control circuit 200 in a HVACR and chiller mode when both the main heat transfer circuit 202 and the chiller heat transfer circuit 204 have a respective climate control demand. In the HVACR and Chiller mode, the main evaporator 240 cools the second process fluid $PF_2$ and the chiller evaporator 260 cools the third process fluid $PF_3$.

In an embodiment, the main expansion valve 230 is a thermostatic expansion (TX) valve, the compressor 210 is a variable speed compressor, and the main heat transfer circuit 202 includes the solenoid valve 270 and the EPR valve 280. In the HVACR and Chiller mode, the chiller EEV 250, the solenoid valve 270, and the EPR valve 280 are at least partially open.

An electronic expansion valve (EEV) has an adjustable opening such that the EEV can be adjusted to set a flowrate of through the EEV. A "position" of the EEV valve refers to the extent that EEV valve is opened or closed. For example, the climate controller 290 may be configured to position the chiller EEV 250 control the flowrate $f_1$ of the working fluid from the chiller EEV 250 to the chiller evaporator 260.

In an embodiment, a speed of the variable speed compressor 210 is based on a temperature difference between the current temperature of the climate controlled space and the temperature setpoint $T_1$. In an embodiment, the controller 290 of the transport climate control system controls the variable speed compressor 210 to have a speed based on said temperature different, and positions the chiller EEV 250 to have a flowrate $f_1$ based on an outlet temperature $T_2$ of the third process fluid $PF_3$ from the chiller evaporator 260. Generally, increasing the flowrate $f_1$ of the working fluid through chiller evaporator 260 increases the amount of heat absorbed from the third process fluid $PF_3$ and reduces the outlet temperature $T_2$ of the third process fluid $PF_3$ from the chiller evaporator 260. In the HVACR and Chiller mode, the chiller EEV 250 is positioned so that the outlet temperature $T_2$ of the third process fluid $PF_3$ is at or below a predetermined setpoint.

In an embodiment, predetermined setpoint can be less than 80° F. In an embodiment, the predetermined setpoint can be at or about 70° F. or less than 70° F. In an embodiment, the predetermined setpoint can be at or about 65° F. or less than 65° F. In an embodiment, the chiller heat transfer circuit 204 can be configured to provide sufficient climate control to one or more batteries to stay within a temperature range of at or about 60-70° F.

In an embodiment, the positioning of the EEV 250 may also be based on the superheat of the working fluid discharge from the chiller evaporator 260. "Superheat" is the difference between the current temperature of a gas and the temperature at which the gas begins to condense. In an embodiment, transport climate control system and/or the climate controller 290 may adjust a position of the EEV 250 based on the superheat of the working fluid discharged from the chiller evaporator 260.

In an embodiment, the EPR valve 280 has a pressure setting that defines a pressure of the working fluid downstream of the EPR valve 280. The EPR valve 280 is configured to adjust the amount of working fluid therethrough to control the pressure downstream of the EPR valve 280 to achieve the desired pressure setting. The EPR 280 is adjustable which allows to its pressure setting to be changed. For example, the climate controller 290 may be configured to adjust a position of the EPR valve 280 such that the pressure of the working fluid downstream is increased or decreased to achieve the desired pressure setting.

An increase in the pressure setting of the EPR valve 280 causes the main evaporator 240 to operate at higher pressure. This causes a larger amount of the working fluid to flow into the chiller EEV 250 and the chiller evaporator 260. For example, closing of the EPR valve 280 causes a greater percentage of the working fluid from the condenser 220 to flow into the second working fluid stream $WF_2$. The closing of the EPR valve 280 decreases the operating pressure in the chiller evaporator 260, lowers the saturation temperature of the working fluid in the chiller evaporator 260, and results in a lower outlet temperature $T_2$ of the third process fluid $PF_3$ from the chiller evaporator 260. In an embodiment, the closing of the EPR valve 280 shifts climate control capacity from the main evaporator 240 to the chiller evaporator 260 (e.g., decreases the cooling ability of the main heat transfer circuit while increasing the cooling ability of the chiller evaporator 260). The EPR valve 280 can shift climate control capacity without significantly increasing the superheat of the working fluid entering the compressor 210. The EPR valve 280 can be used to shift climate control capacity while also preventing the superheat of the working fluid entering the compressor 210 from exceeding a desired amount. In an embodiment, the EPR valve 280 beneficially controls the saturation temperature of the working fluid at the chiller evaporation 260 to meet the climate control demand of the chiller heat transfer circuit 204 even when the main heat transfer circuit 202 is providing large climate control (e.g., the main evaporator 240 is providing large climate control), colder third process fluid $PF_3$ is requested, and/or the compressor 210 is operating at low speeds.

The pressure setting of the EPR valve 280 may be increased by partially closing the EPR valve 280. In the HVACR and Chiller mode, when the EPR valve 280 reaches at or about a preset limit, the speed of the variable speed compressor 210 is increased and adjustment of the EPR valve 280 is decreased. In an embodiment, the preset adjustment limit is a limit on an amount the EPR valve 280 can be closed in in the HVACR and Chiller mode. In an embodiment, the EPR valve 280 is decreased after the speed increase of the variable speed compressor 210. In an embodiment, the EPR valve 280 is reset (e.g., fully opened, set to its original pressure setting, etc.) after the speed increase of the variable speed compress 210 and if the outlet temperature $T_4$ of the second process fluid $PF_2$ is at or below the predetermined setpoint. In an embodiment, compressor 210 may be a single speed compressor and the EPR valve 280 may be used to vary the climate control capacity of the main evaporator 240.

In an embodiment, the main expansion valve 230 is a main electronic expansion valve (EEV). In an embodiment, the climate control circuit 200 includes the main EEV 230 and the chiller EEV 250. In the HVACR and Chiller mode, the main EEV 230 controls the flow of the working fluid in first working fluid stream $WF_1$ to the main evaporator 240 while the chiller EEV 230 controls the flow of the working fluid in the second working fluid stream $WF_2$ to the chiller evaporator 260. The two EEVs 230, 250 are located in parallel relative to each other downstream of the condenser 220.

An electronic expansion valve (EEV) is adjustable to set a flowrate of working fluid through the EEV. For example, the climate controller 290 may be configured to operate/adjust the main EEV 230 to change the flowrate $f_2$ of the working fluid to and through the main evaporator 240, and to operate/adjust the chiller EEV 250 to change the flowrate $f_1$ of the working fluid to and through the chiller evaporator 260.

In an embodiment, the electronic component 206 generates a substantial amount of heat quickly. For example, the electronic component 206 in an embodiment may be a battery(s) that generate significant heat quickly when charging, discharging electric component(s), and/or electrical supplying component(s). Further, the electronic component 206 in an embodiment can have significant temperature sensitivity when being used.

The main EEV 230 and the chiller EEV 250 are each adjustable to be fully closed, fully open, and have a plurality of positions (i.e., steps) in between fully open and fully closed. In an embodiment, the main EEV 230 in the HVACR and chiller mode closes at least partially. The closure of the main EEV 230 redirects working fluid to the chiller evaporator 260, and increases the flow of working fluid through the chiller evaporator 260. This shifts climate control capacity from the main evaporator 240 to the chiller evaporator 260. The closure of the main EEV 230 starves the main evaporator 240 of working fluid.

The main EEV 230 and the chiller EEV 250 are independently adjustable. In an embodiment, the transport climate control system and/or the controller 290 may be configured so that the adjustments of the main EEV 230 and the adjustment to the chiller EEV 250 are tried together. In an embodiment, the main EEV 230 and the chiller EEV 250 may be configured to be modulated so that the transfer of capacity between the main evaporator 240 and the chiller evaporator 260 occurs smoothly.

In an embodiment, the main EEV 230 and the chiller EEV 250 may be configured so that the modulation of the EEV 230 and the chiller EEV 250 are tied together so that the transfer of capacity between the main evaporator 240 and the chiller evaporator 260 occurs at more quickly depending upon the current capacity distribution between the main evaporator 240 and the chiller evaporator 260. In an embodiment, the transport climate control system and/or the controller 290 may control modulation of the EEV 230 and the chiller EEV 250 so that the shift of capacity is limited. For example, this can advantageously help prevent flow changes that have a negative impact on the operation of the condenser 220.

In an embodiment, the climate control circuit 200 is configured to, in part, allow for fast shifting of the climate control capacity between the main evaporator 240 and the chiller evaporator 260. In an embodiment, this can be beneficial for electrical components that quickly generate significant heat and/or need to be cooled quickly. In an embodiment, this can be beneficial when high energy is required from the battery(s) and/or during high power charging of the battery(s).

HVACR Mode

In an embodiment, the climate control circuit 200 can operate in a HVACR mode when the main heat transfer circuit 202 has a climate control demand and the chiller heat transfer circuit 204 does not have a climate control demand. In the HVACR mode, the main evaporator 240 provides cooling to the second process fluid $PF_2$, while the chiller evaporator 260 does not provide cooling to the third process fluid $PF_3$.

In the HVACR mode, flow through the chiller evaporator 260 is blocked. In an embodiment, the chiller EEV 250 is closed. The closed chiller EEV 250 prevents working fluid from passing through the chiller EEV 250 and the chiller evaporator 260. In an embodiment, the second working fluid stream $WF_2$ may include a solenoid valve 255 upstream of the evaporator chiller 260. The solenoid valve 255 is closed and prevents working fluid from flowing to and passing through the chiller evaporator 260.

In an embodiment, the main expansion valve 230 is a thermostatic expansion (TX) valve, the compressor 210 is a variable speed compressor, and the main heat transfer circuit 202 includes the solenoid valve 270 and the EPR valve 280 as discussed above. In an embodiment, the EPR valve 280 and the solenoid valve 270 are at least partially open in the HVACR mode.

In the HVACR mode, the working fluid discharged from the condenser 220 flows through the solenoid valve 270 and the TX valve 230 to the main evaporator 240, and through the main evaporator and the EPR valve 280 to the suction inlet 212 of the variable speed compressor 210. In the HVACR mode, the speed of the variable speed compressor 210 is based on the climate control demand for the climate controlled space. In an embodiment, the speed of the variable speed compressor 210 is based on the temperature of the climate controlled space and/or the outlet temperature $T_4$ of the second process fluid $PF_2$.

In an embodiment, the main expansion valve 230 is a main electronic expansion valve (EEV) as discussed above. In the HVACR mode, a position of the main EEV 230 may be adjusted based on climate control demand of the climate controlled space. In an embodiment, the speed of the compressor 210 is controlled based on the climate control demand of the climate control demand in the HVACR mode. In an embodiment, flowrate of working fluid $f_2$ through the main EEV 230 may be based on the temperature of the climate controlled space and/or the outlet temperature $T_4$ of the second process fluid $PF_2$. In an embodiment, the controller 290 can be configured to control and/or adjust the position of main EEV 230 so that superheat of the working fluid entering the compressor 210 does not exceed a desired amount.

Chiller Mode

In an embodiment, the heat transfer circuit 202 can operate in chiller mode when the chiller heat transfer circuit 204 has a climate control demand and the main heat transfer circuit 202 does not have a climate control demand. In the chiller mode, the chiller evaporator 240 provides cooling to the second process fluid $PF_3$, while the main evaporator 240 does not provide cooling to the third process fluid $PF_2$.

In an embodiment, the main expansion valve 230 is a thermostatic expansion (TX) valve, the compressor 210 is a variable speed compressor, and the main heat transfer circuit 202 includes the solenoid valve 270 and the EPR valve 280 as discussed above. In an embodiment, the solenoid valve 270 is closed and the chiller EEV 250 is at least partially open in the chiller mode.

The closed solenoid valve 270 prevents working fluid from flowing through the main evaporator 240. In the chiller mode, the working fluid discharged from the condenser 220 flows through chiller EEV 250 to and through the chiller evaporator 260. In the chiller mode, the speed of the variable speed compressor 210 and the position of the chiller EEV 250 are based on the climate control demand for the chiller heat transfer circuit 204. In an embodiment, the speed of the variable speed compressor 210 and the position of the chiller EEV 250 are based on the temperature $T_1$ of the electrical component 206 and/or the outlet temperature $T_2$ of the third process fluid $PF_3$. In an embodiment, the transport climate control system and/or the climate controller 290 in the chiller mode are configured to operate the variable speed compressor 210 at the lowest speed that achieves a desired outlet temperature $T_2$ of the third process fluid $PF_3$.

In an embodiment, the main expansion valve 230 is a main electronic expansion valve (EEV) as discussed above. In the chiller mode, the main EEV 230 is closed and prevents working fluid flow flowing to and through the main evaporator 240.

FIG. 3 is a block flow diagram of an embodiment of a method 300 of operating a transport climate control system (e.g., transport climate control system 110, transport climate control system 132, transport climate control system 145, MTCS 162, transport climate control system 187) for a climate controlled transport unit (e.g., climate controlled van 100, climate controlled straight truck 130, climate controlled transport unit 140, climate controlled transport unit 160, vehicle 185). The transport climate control system includes a climate control circuit (e.g., climate control circuit 200) that includes a main heat transfer circuit (e.g., main heat transfer circuit 202) and a chiller heat transfer circuit (e.g., chiller heat transfer circuit 204). The main heat transfer circuit provides climate control to a climate controlled space (e.g., climate controlled space 105, climate controlled space 131, climate controlled space 154, climate controlled space 170, climate controlled space 189). In an embodiment, the chiller heat transfer circuit provides climate control to at least one or more electronic component(s) of the climate controlled transport unit or a tractor that tows the climate controlled transport unit (e.g., electronic component 206, battery 109, battery 139, battery 146, battery 153, battery 165, battery 198). The method starts at 310.

At 310, a controller (e.g., the controller 290 shown in FIG. 2) of the transport climate control system detects one or more climate control parameter(s) of the climate controlled transport or an attached tractor (e.g., tractor 145). In an embodiment, the one or more parameters may include, for example but not limited to, a temperature of the climate controlled space, a temperature of an electronic component (e.g., temperature $T_1$), a temperature of a second climate controlled space (e.g., second climate controlled space 107, second climate controlled space 138, second climate controlled space 144), a return temperature of a process fluid (e.g., temperature $T_6$ of the second process fluid $PF_2$), and/or a return temperature of a second process fluid (e.g., temperature $T_7$ of the third process fluid $PF_3$). The method 300 then proceeds to 320.

At 320, the controller determines a climate control demand of the main heat transfer circuit and a climate control demand of the chiller heat transfer circuit. In some embodiments, the climate control demand of the main heat transfer circuit and the chiller heat transfer circuit can be determined based on the climate control parameter(s) obtained at 310.

In an embodiment, the climate control demand of the chiller heat transfer circuit can be a cooling demand for the electronic component (e.g., a battery cooling demand, etc.). In such an embodiment, the chiller heat transfer circuit can have a climate control demand when a temperature of the electronic component exceeds a predefined limit. In an embodiment, the predefined limit may be, for example, a temperature at which the electronic components operates less efficiently or a temperature to prevent thermal damage of the electronic component.

In an embodiment, the climate control demand of the main heat transfer circuit can be a cooling demand for the climate controlled space. In such an embodiment, a cooling demand for the climate controlled space can occur when a difference between the temperature of the climate controlled space and a setpoint temperature exceeds a predetermined amount. The method then proceeds to 330.

At 330, the controller determines whether both the main heat transfer circuit and chiller heat transfer circuit have climate control demands. If the controller determines that both the main heat transfer circuit and chiller heat transfer circuit have climate control demands, the method 300 proceeds to 340. If the controller determines that both the main heat transfer circuit and chiller heat transfer circuit do not have climate control demands, the method 300 proceeds to 350.

At 340, the climate control system operates the climate control circuit in a HVCR and Chiller Mode. Operating the climate control circuit in the HVACR and Chiller mode 340 can include directing working fluid from a condenser (e.g., condenser 220) into parallel streams that extend through a main evaporator (e.g., main evaporator 240) and a chiller evaporator (e.g., chiller evaporator 260) of the main heat transfer circuit that are located in parallel to each other. The parallel streams can include a first stream (e.g., first working fluid stream $WF_1$) that extends through a main expansion valve (e.g., main expansion valve 230) and the main evaporator, and a second stream that extends through a chiller electronic expansion valve (EEV) (e.g., chiller EEV 250) and the chiller evaporator.

Operating in the HVACR and Chiller mode 340 can include operating the chiller EEV in an open position in which the chiller EEV is at least partially opened. In an embodiment, the open position of the chiller EEV can be based on the climate control demand of the chiller heat transfer circuit.

In an embodiment, operating the climate control circuit in the HVACR and Chiller mode can include controlling a speed of a variable speed compressor (e.g., compressor 210) and adjusting an electronic pressure regulator (EPR) valve (e.g., EPR valve 280) in the main heat transfer circuit. The EPR valve is located in the first stream and is configured to regulate a pressure of the working fluid (e.g., pressure $P_3$) discharged from the main evaporator. In an embodiment, the variable speed compressor can be controlled based on climate control demands of the main heat transfer circuit and the chiller heat transfer circuit. In an embodiment, the EPR valve and the chiller EEV can be modulated to change the climate control provided by the main evaporator and the chiller evaporator. In an embodiment, the transport climate control system closes the EPR valve to shift climate control capacity (e.g., cooling capacity) in the climate control circuit from the main evaporator to the chiller evaporator. The climate control circuit operates the EPR valve based on the outlet temperature of the process fluid from the chiller evaporator (e.g., outlet temperature $T_2$ of the third process fluid $PF_3$) and a superheat of the working fluid discharged from the chiller evaporator. The method 300 then returns to 320 or optionally 310.

At 350, the controller determines whether the main heat transfer circuit has a climate control demand and the chiller heat transfer circuit does not have a climate control demand. If the controller determines that the main heat transfer circuit has a climate control demand and the chiller heat transfer circuit does not have a climate control demand, the method 300 proceeds 360. Otherwise, the method 300 proceeds to 370.

At 360, the climate control system operates the main climate control circuit in a HVACR mode. Operating the climate control circuit in the HVACR mode 360 can include directing working fluid from the condenser through the main expander and the main evaporator, and blocking flow of the working fluid through the chiller evaporator. In an embodiment, blocking flow of the working fluid through the chiller evaporator includes positioning the EEV valve in a closed position. In an embodiment, blocking flow of the working fluid through the chiller evaporator can include closing a solenoid valve (e.g., solenoid valve 255) upstream of the evaporator chiller and downstream of the condenser.

In an embodiment, operating the climate control circuit in the HVACR mode 360 can include controlling a speed of the variable speed compressor in the main heat transfer circuit based on the climate control demand of the main heat transfer circuit. In an embodiment, the speed of the variable speed compressor can be adjusted based on the temperature of the climate controlled space, an outlet temperature of the process fluid from the main evaporator (e.g., outlet temperature $T_4$ of the second process fluid $PF_2$), and/or a return temperature of the process fluid (e.g., return temperature $T_6$ of the second process fluid $PF_2$) to the main evaporator. The method 300 then returns to 320 or optionally 310.

At 370, the controller determines whether the chiller heat transfer circuit has a climate control demand and the main heat transfer circuit does not have a climate control demand. If the controller determines that the chiller heat transfer circuit has a climate control demand and the main heat transfer circuit does not have a climate control demand, then the method 300 proceeds to 380. Otherwise, the method 300 proceeds back to 320 or optionally 310. In an embodiment, the method proceeds back to 310 from 370 when neither the main heat transfer circuit nor the chiller heat transfer circuit have a climate control demand.

At 380, the climate control system operates the main climate control circuit in a chiller only mode. Operating the climate control circuit in the chiller mode 380 can include directing working fluid from the condenser through the chiller EEV and the chiller evaporator and blocking flow of the working fluid through the main evaporator.

Directing working fluid from the condenser through the chiller EEV in 380 can include positioning the chiller EEV in an open position which allows the working fluid to pass through the chiller EEV to the chiller evaporator. In an embodiment, the open position of the chiller EEV can be based on the climate control demand of the chiller heat transfer circuit. In an embodiment, the open position of the chiller EEV may be based on one or more of a temperature of the electrical component (e.g., temperature $T_1$ of the electrical component 206), the return temperature of the second process fluid to the chiller evaporator (e.g., return temperature $T_7$ of the third process fluid $PF_3$), and/or the outlet temperature of the process fluid from the chiller evaporator (e.g., outlet temperature $T_2$ of the third process fluid $PF_3$).

In an embodiment, blocking the flow of the working fluid through the main evaporator in 380 can include positioning a solenoid valve (e.g., solenoid valve 270) in a closed position. The solenoid valve can be disposed downstream of the condenser and upstream of the main evaporator. The closed solenoid valve can block the working fluid discharged from the condenser from flowing to and through the main evaporator.

In an embodiment, the main expansion valve in the heat transfer circuit is a main electronic expansion valve (EEV). In an embodiment, blocking the flow of the working fluid through the main evaporator in 380 includes positioning the main EEV in a closed position. The closed main EEV blocks the working fluid discharged from the condenser from flowing to and through the main evaporator.

It should be appreciated that in some embodiments one or more of the determinations and actions in the method 300 may be performed by a climate controller (e.g., climate controller 125, climate controller 135, climate controller 156, climate controller 195) of the transport climate control system in an embodiment. In an embodiment, the method 300 may include and/or be modified to include features of the climate control circuit 200 as shown in FIG. 2 and/or described above.

Aspects

Any of aspects 1-7 can be combined with any of aspects 8-14.

Aspect 1. A transport climate control system for a climate controlled transport unit, the climate controlled transport unit including a climate controlled space, the transport climate control system comprising:

a main heat transfer circuit including:
a compressor to compress a working fluid,
a condenser downstream of the compressor to cool the working fluid compressed by the compressor with a first process fluid,
a main expansion valve and a chiller electronic expansion valve (EEV) located in parallel with each other downstream of the condenser to expand the working fluid cooled by the condenser,
a main evaporator and a chiller evaporator located in parallel to each other downstream of the condenser to heat the working fluid expanded by the main expansion valve and the chiller EEV, wherein the working fluid expanded by the main expansion valve is configured to flow through the main evaporator and cool a second process fluid in the main evaporator, the main expansion valve or an electronic pressure regulator valve downstream of the main evaporator configured to adjust climate control capacity of the main evaporator, wherein the working fluid expanded by the chiller EEV is configured to flows through the chiller evaporator and cool a third process fluid in the chiller evaporator, the chiller EEV controlling flow of the working fluid to the chiller evaporator; and
a chiller heat transfer circuit including:
the chiller evaporator, the third process fluid is configured to flow through the chiller heat transfer circuit and provide auxiliary cooling within the transport climate control system, wherein
the second process fluid is configured to cool the climate controlled space.

Aspect 2. The transport climate control system of aspect 1, wherein the third process fluid is configured to cool one or more of a battery of the climate controlled transport unit and a battery of a tractor attached to the climate controlled transport unit.

Aspect 3. The transport climate control system of either one of aspects 1 and 2, wherein the third process fluid is a liquid.

Aspect 4. The transport climate control system of any one of aspects 1-3, wherein the compressor is a variable speed compressor.

Aspect 5. The transport climate control system of any one of aspects 1-4, wherein the main expansion valve is a thermostatic expansion valve, and the main heat transfer circuit includes:
the electronic pressure regulator valve downstream of the main evaporator and upstream of the compressor, the electronic pressure regulator configured to control a pressure of the working fluid discharged from the main evaporator.

Aspect 6. The transport climate control system of aspect 5, wherein the electronic pressure regulator valve is configured to control the pressure of the working fluid discharged from the main evaporator based on an outlet temperature of the third process fluid from the chiller evaporator.

Aspect 7. The transport climate control system of any one of aspects 1-6, wherein the main expander is an electronic expansion valve controlling flow of the working fluid to the main evaporator.

Aspect 8. A method of operating a transport climate control system for a climate controlled transport unit, the transport climate control system including a main heat transfer circuit and a chiller heat transfer circuit, the main heat transfer circuit including a compressor, a condenser, a main evaporator and a chiller evaporator located in parallel to each other downstream of the condenser, and a main expansion valve and a chiller electronic expansion valve (EEV) downstream of the condenser, the method comprising:

determining a climate control demand for the main heat transfer circuit and a climate control demand for the chiller heat transfer circuit;

operating in a HVACR and chiller mode when the main heat transfer circuit has the climate control demand and the chiller heat transfer circuit has the climate control demand, wherein operating in the HVACR and chiller mode includes directing working fluid in parallel streams through the main evaporator and the chiller evaporator, wherein the main evaporator cools a first process fluid configured to cool a climate controlled space in the climate controlled transport unit, the main expansion valve or an electronic pressure regulator valve downstream of the main evaporator adjust configured to adjust climate capacity of the main evaporator, wherein the chiller evaporator cools a second process fluid that supplies auxiliary cooling within the transport climate control system, a chiller EEV controlling a flow of the working fluid to and through the chiller evaporator;

operating in the HVACR mode when only the main heat transfer circuit has the climate control demand, wherein operating in the HVACR mode includes directing the working fluid through the main evaporator and blocking flow of the working fluid to the chiller evaporator; and operating in the chiller mode when only the chiller heat transfer circuit has the climate control demand, wherein operating in the chiller mode includes directing the working fluid through the chiller evaporator and blocking flow of the working fluid through the main evaporator.

Aspect 9: The method of aspect 8, wherein directing the working fluid through the chiller evaporator in the chiller mode includes positioning the chiller EEV in an open position based on the climate control demand of the chiller heat transfer circuit.

Aspect 10. The method of either one of aspects 8 and 9, wherein directing working fluid in parallel streams through the main evaporator and the chiller evaporator in the HVACR and chiller mode includes:

directing a first portion of the working fluid from the condenser through a first stream of the parallel streams that includes the main expansion valve and the main evaporator, and directing a second portion of the working fluid from the condenser through a second stream that includes the chiller EEV and the chiller evaporator.

Aspect 11. The method of any one of aspects 8-10, wherein the main expansion valve is a thermostatic expansion valve, and directing working fluid in parallel streams through the main evaporator and the chiller evaporator in the HVACR and chiller mode includes:

directing a portion of the working fluid from the condenser through a first stream of the parallel streams that includes the thermostatic expansion valve, the main evaporator, and the electronic pressure regulator valve downstream of the main evaporator and upstream of the compressor, and controlling the position of the an electronic pressure regulator valve based on outlet temperature of the second process fluid from the chiller evaporator and a superheat of the working fluid discharged from the chiller evaporator.

Aspect 12. The method of any one of aspects 8-11, wherein the compressor is a variable speed compressor, and operating in the HVACR and chiller mode includes controlling a speed of the variable speed compressor based on the outlet temperature of the second process fluid from the chiller expander.

Aspect 13. The method of aspect 12, wherein operating in the HVACR and chiller mode includes increasing a speed of the variable speed compressor to avoid positioning the electronic pressure regulator valve at or above a preset limit.

Aspect 14. The method of any one of aspects 8-13, wherein the main expansion valve is a main electronic expansion valve (EEV), and directing working fluid in parallel streams through the main evaporator and the chiller evaporator in the HVACR and chiller mode includes:

positioning the main EEV based on a climate control demand of the main evaporator, and positioning the chiller EEV based on the climate control demand of the chiller heat transfer circuit.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A transport climate control system for a climate controlled transport unit, the climate controlled transport unit including a climate controlled space, the transport climate control system comprising:

a main heat transfer circuit including:

a compressor to compress a working fluid, a condenser downstream of the compressor to cool the working fluid compressed by the compressor with a first process fluid, a main expansion valve and a chiller electronic expansion valve (EEV) located in parallel with each other downstream of the condenser to expand the working fluid cooled by the condenser, a main evaporator and a chiller evaporator located in parallel to each other downstream of the condenser to heat the working fluid expanded by the main expansion valve and the chiller EEV, wherein the working fluid expanded by the main expansion valve is configured to flow through the main evaporator and cool a second process fluid in the main evaporator, the main expansion valve or an electronic pressure regulator valve downstream of the main evaporator configured to adjust climate control capacity of the main evaporator, wherein the working fluid expanded by the chiller EEV is configured to flow through the chiller evaporator and cool a third process fluid in the chiller evaporator, the chiller EEV controlling flow of the working fluid to the chiller evaporator;

a controller for controlling the transport climate control system, the controller shifts the climate control capacity from the main evaporator to the chiller evaporator by one of:

partially closing the electronic pressure regulator valve, or partially closing the main expansion valve that is an electronic expansion valve; and a chiller heat transfer circuit including:

the chiller evaporator, the third process fluid is configured to flow through the chiller heat transfer circuit and provide auxiliary cooling within the transport climate control system, wherein the second process fluid is configured to cool the climate controlled space.

2. The transport climate control system of claim 1, wherein the third process fluid is configured to cool one or more of a battery of the climate controlled transport unit and a battery of a tractor attached to the climate controlled transport unit.

3. The transport climate control system of claim 2, wherein the third process fluid is a liquid.

4. The transport climate control system of claim 1, wherein the compressor is a variable speed compressor.

5. The transport climate control system of claim 4, wherein the main expansion valve is a thermostatic expansion valve, and the main heat transfer circuit includes:

the electronic pressure regulator valve downstream of the main evaporator and upstream of the compressor, the electronic pressure regulator configured to control a pressure of the working fluid discharged from the main evaporator.

6. The transport climate control system of claim 1, wherein the controller shifts the climate control capacity from the main evaporator to the chiller evaporator by partially closing the main expansion valve is the electronic expansion valve.

7. The transport climate control system of claim 1, wherein the heat transfer circuit includes the electronic pressure regulator valve, and the controller shifts the climate control capacity from the main evaporator to the chiller evaporator by partially closing the electronic pressure regulator valve.

8. A transport climate control system for a climate controlled transport unit, the climate controlled transport unit including a climate controlled space, the transport climate control system comprising:

a main heat transfer circuit including:

a compressor to compress a working fluid, a condenser downstream of the compressor to cool the working fluid compressed by the compressor with a first process fluid, a main expansion valve and a chiller electronic expansion valve (EEV) located in parallel with each other downstream of the condenser to expand the working fluid cooled by the condenser, the main expansion valve being a thermostatic expansion valve, a main evaporator and a chiller evaporator located in parallel to each other downstream of the condenser to heat the working fluid expanded by the main expansion valve and the chiller EEV, wherein the working fluid expanded by the main expansion valve is configured to flow through the main evaporator and cool a second process fluid in the main evaporator, wherein the working fluid expanded by the chiller EEV is configured to flow through the chiller evaporator and cool a third process fluid in the chiller evaporator, the chiller EEV controlling flow of the working fluid to the chiller evaporator, and an electronic pressure regulator valve downstream of the main evaporator and upstream of the compressor configured to adjust climate control capacity of the main evaporator, the electronic pressure regulator valve is configured to control a pressure of the working fluid discharged from the main evaporator based on an outlet temperature of the third process fluid from the chiller evaporator; and a chiller heat transfer circuit including:

the chiller evaporator, the third process fluid is configured to flow through the chiller heat transfer circuit and provide auxiliary cooling within the transport climate control system, wherein the second process fluid is configured to cool the climate controlled space.

9. A method of operating a transport climate control system for a climate controlled transport unit, the transport climate control system including a main heat transfer circuit and a chiller heat transfer circuit, the main heat transfer circuit including a compressor, a condenser, a main evaporator and a chiller evaporator located in parallel to each other downstream of the condenser, and a main expansion valve and a chiller electronic expansion valve (EEV) downstream of the condenser, the method comprising:

determining a climate control demand for the main heat transfer circuit and a climate control demand for the chiller heat transfer circuit;

operating in a HVACR and chiller mode when the main heat transfer circuit has the climate control demand and the chiller heat transfer circuit has the climate control demand, wherein operating in the HVACR and chiller mode includes directing working fluid in parallel streams through the main evaporator and the chiller evaporator, wherein the main evaporator cools a first process fluid configured to cool a climate controlled space in the climate controlled transport unit, the main expansion valve or an electronic pressure regulator valve downstream of the main evaporator configured to adjust climate capacity of the main evaporator, wherein the chiller evaporator cools a second process fluid that supplies auxiliary cooling within the transport climate control system, a chiller EEV controlling a flow of the working fluid to and through the chiller evaporator, wherein operating in the HVACR and chiller mode includes shifting the climate control capacity from the main evaporator to the chiller evaporator by one of:

partially closing the electronic pressure regulator valve, or partially closing the main expansion valve that is an electronic expansion valve;

operating in the HVACR mode when only the main heat transfer circuit has the climate control demand, wherein operating in the HVACR mode includes directing the working fluid through the main evaporator and blocking flow of the working fluid to the chiller evaporator; and operating in the chiller mode when only the chiller heat transfer circuit has the climate control demand, wherein operating in the chiller mode includes directing the working fluid through the chiller evaporator and blocking flow of the working fluid through the main evaporator.

10. The method of claim 9, wherein directing the working fluid through the chiller evaporator in the chiller mode includes positioning the chiller EEV in an open position based on the climate control demand of the chiller heat transfer circuit.

11. The method of claim 9, wherein directing working fluid in parallel streams through the main evaporator and the chiller evaporator in the HVACR and chiller mode includes:
   directing a first portion of the working fluid from the condenser through a first stream of the parallel streams that includes the main expansion valve and the main evaporator, and
   directing a second portion of the working fluid from the condenser through a second stream that includes the chiller EEV and the chiller evaporator.

12. The method of claim 9, wherein
   the main expansion valve is a thermostatic expansion valve, and
   directing working fluid in parallel streams through the main evaporator and the chiller evaporator in the HVACR and chiller mode includes:
      directing a portion of the working fluid from the condenser through a first stream of the parallel streams that includes the thermostatic expansion valve, the main evaporator, and the electronic pressure regulator valve downstream of the main evaporator and upstream of the compressor, and
      controlling the position of the electronic pressure regulator valve based on an outlet temperature of the second process fluid from the chiller evaporator and a superheat of the working fluid discharged from the chiller evaporator.

13. The method of claim 12, wherein
   the compressor is a variable speed compressor, and
   operating in the HVACR and chiller mode includes controlling a speed of the variable speed compressor based on the outlet temperature of the second process fluid from the chiller evaporator.

14. The method of claim 13, wherein operating in the HVACR and chiller mode includes increasing a speed of the variable speed compressor to avoid positioning the electronic pressure regulator valve at or above a preset limit.

15. The method of claim 9, wherein
   the main expansion valve is the electronic expansion valve (main EEV), and
   directing working fluid in parallel streams through the main evaporator and the chiller evaporator in the HVACR and chiller mode includes:
      positioning the main EEV based on a climate control demand of the main evaporator, and
      positioning the chiller EEV based on the climate control demand of the chiller heat transfer circuit.

16. The method of claim 9, wherein the shifting of the climate control capacity from the main evaporator to the chiller evaporator is by partially closing the electronic pressure regulator valve.

17. The method of claim 9, wherein the shifting of the climate control capacity from the main evaporator to the chiller evaporator is by partially closing the main expansion valve that is the electronic expansion valve.

* * * * *